United States Patent
Riess et al.

(10) Patent No.: US 8,857,587 B2
(45) Date of Patent: Oct. 14, 2014

(54) METHOD FOR THE OPERATION OF AN OPEN 3-LINE TYPE HYDRODYNAMIC COUPLING DEVICE

(75) Inventors: Thomas Riess, Haßfurt (DE); Christian Selinka, Poppenhausen (DE); Stefan Pümmler, Bergrheinfeld (DE); Günter Grau, Würzburg (DE)

(73) Assignee: ZF Friedrichshafen AG, Friedrichshafen (DE)

(*) Notice: Subject to any disclaimer, the term of this patent is extended or adjusted under 35 U.S.C. 154(b) by 278 days.

(21) Appl. No.: 13/298,076

(22) Filed: Nov. 16, 2011

(65) Prior Publication Data

US 2012/0118694 A1      May 17, 2012

(30) Foreign Application Priority Data

Nov. 17, 2010   (DE) .......................... 10 2010 044 032

(51) Int. Cl.

| | |
|---|---|
| *F16H 61/14* | (2006.01) |
| *F16H 61/50* | (2006.01) |
| *F16H 59/14* | (2006.01) |
| *F16H 59/72* | (2006.01) |
| *F16H 41/30* | (2006.01) |
| *F16H 45/02* | (2006.01) |

(52) U.S. Cl.
CPC ........ *F16H 41/30* (2013.01); *F16H 2045/0205* (2013.01); *F16H 61/50* (2013.01); *F16H 59/14* (2013.01); *F16H 59/72* (2013.01); *F16H 45/02* (2013.01); *F16H 2045/0294* (2013.01)
USPC .......................................... 192/3.3; 192/82 T

(58) Field of Classification Search
USPC ..................................................... 192/3.29, 3.3
See application file for complete search history.

(56) References Cited

U.S. PATENT DOCUMENTS

| | | | | |
|---|---|---|---|---|
| 5,669,475 | A  * | 9/1997 | Matsuoka ................... | 192/3.29 |
| 6,662,918 | B2 * | 12/2003 | Takeuchi et al. ............. | 192/3.29 |
| 2004/0226795 | A1 * | 11/2004 | Morise et al. ................ | 192/3.29 |

* cited by examiner

*Primary Examiner* — Richard M. Lorence
(74) *Attorney, Agent, or Firm* — Cozen O'Connor

(57) ABSTRACT

A method for operating an open 3-line type hydrodynamic coupling device, in which a fluid pressure displacing a clutch piston in an engaging direction is provided in the first space area for engaging the lockup clutch, and a fluid pressure displacing the clutch piston in the disengaging direction is provided in a second space area for disengaging the lockup clutch. A fluid supply pressure for the first space area and/or a fluid supply pressure for the second space area are/is adjusted depending on at least one operating variable in the engaged state of the lockup clutch and/or in the disengaged state of the lockup clutch and/or for engaging the lockup clutch and/or for disengaging the lockup clutch.

4 Claims, 3 Drawing Sheets

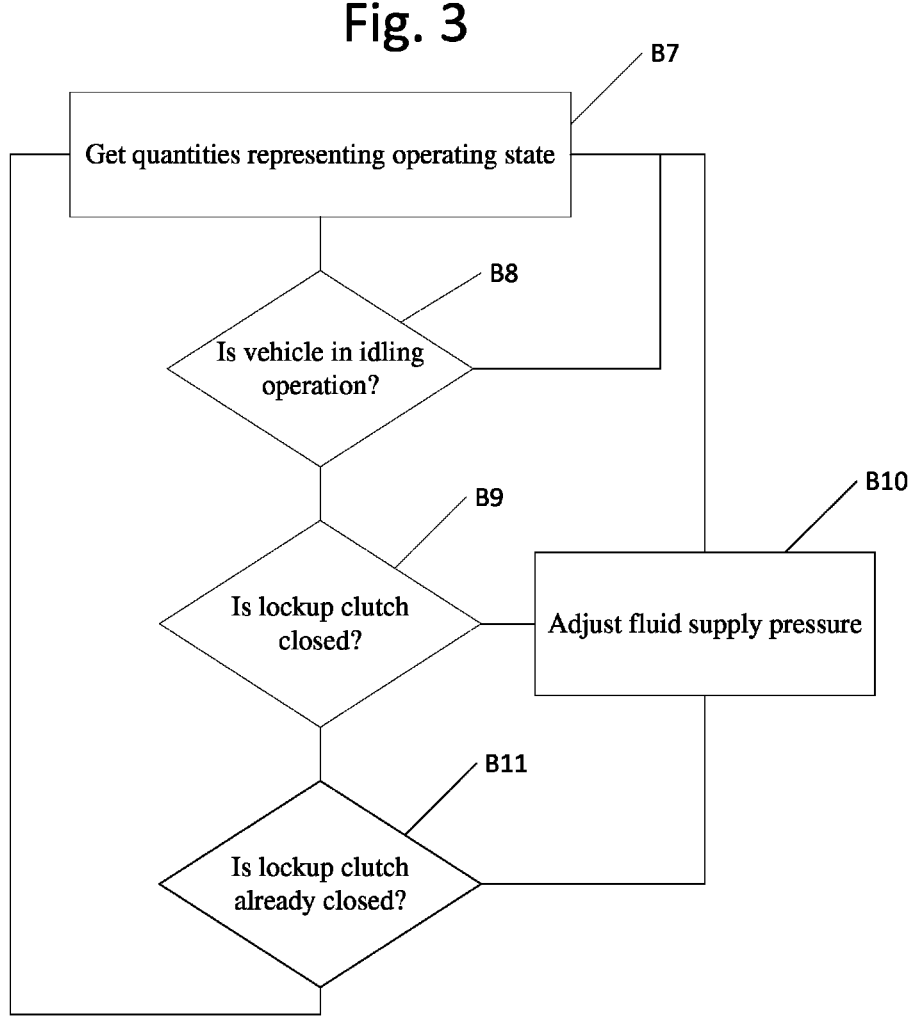

METHOD FOR THE OPERATION OF AN OPEN 3-LINE TYPE HYDRODYNAMIC COUPLING DEVICE

BACKGROUND OF THE INVENTION

1. Field of the Invention

The present invention is directed to a method for operating an open 3-line type hydrodynamic coupling device, particularly a hydrodynamic torque converter.

2. Description of the Related Art

A hydrodynamic coupling device of the type mentioned above is shown in FIG. 1 and is designated generally by 10. It comprises a housing 12 having two housing shells 14, 16. The housing shell 14 is positioned in a drivetrain so as to face a drive unit and is coupled therewith by a coupling arrangement, not shown, such as a flex plate, for rotation around an axis of rotation A. The housing shell 16, which is connected in a fluid-tight manner in its radially outer area to housing shell 14, e.g., by welding, is positioned to face a gear unit and, together with impeller blades 18 supported at an inner side thereof, forms an impeller, designated generally by 20. An impeller hub 22 is provided at the radially inner area of the housing shell 16 positioned to engage in a gear unit and can be used, for example, to drive a fluid pump, e.g., an oil pump, which is provided at the latter.

A turbine 26 is arranged axially opposite the impeller 20 in an interior space 24 of the housing 12. This turbine 26 has a plurality of turbine blades 30 arranged successively in circumferential direction at a turbine shell 28. The turbine shell 28 is connected on the radially inner side to a turbine hub 32 acting as a driven member. This turbine hub 32 can be coupled via an inner toothing to a transmission input shaft for joint rotation around an axis of rotation A.

A stator 34 having stator blades 36 is located in the radially inner area axially between the impeller 20 and the turbine 24. The stator 34 has a freewheeling arrangement, designated generally by 38, which permits a rotation of the stator blades 36 around the axis of rotation A in only one rotating direction. In axial direction, the stator 34 and the freewheeling arrangement 38 thereof are supported by two pressure disks 40, 42 and respective axial bearings 44, 46 with respect to the turbine 26 and turbine hub 32 acting as driven member on one side and with respect to the housing 12 and housing shell 16 on the other side.

Further, a lockup clutch 48 is provided in the interior space 24. This lockup clutch 48 comprises an axially movable clutch piston 50 which divides the interior space 24 into a first space area 52 which also contains the turbine 26 and a second space area 54 formed substantially between the clutch piston 50 and the housing shell 14. On the radially inner side, the clutch piston 50 is supported on the turbine hub 32 in a fluid-tight manner and so as to be axially movable so that there is no fluid communication connection between the two space areas 52, 54. The torque transmission connection between the clutch piston 50 and the turbine hub 32 is carried out by a torsional vibration damper arrangement 56 whose input region is connected to the clutch piston 50 and whose output region is connected to the turbine hub 32. Damper elements which are constructed, e.g., as helical compression springs act between the input region and the output region and allow a relative rotation between the input region and output region. In this connection, it is noted that, of course, a torsional vibration damper of this kind can also act in the torque transmission path between the turbine shell 28 and the turbine hub 32, or two torsional vibration dampers can act in series and, for example, the turbine shell 28 can be connected to an intermediate region between the two torsional vibration dampers.

In the engaged state of the lockup clutch 48, the clutch piston 50 can be pressed by its radially outer region against an inner surface of the housing 12, in this case the housing shell 14. For this purpose, a friction facing can be provided, for example, at the clutch piston 50. In this connection, it is noted that the lockup clutch 48 can also have a plurality of lamellar friction elements, some of which are rotatably coupled with the clutch piston 50 and some of which are rotatably coupled with the housing 12 and which can be pressed against one another through the movement of the clutch piston 50 in the engagement direction.

In the disengaged state of the lockup clutch, the clutch piston 50 is so positioned on the radially outer side, and moved away from the housing shell 14 here, that there is communication between the two space areas 52, 54 in the radially outer region of the clutch piston 50; hence the designation "open". To permit fluid communication between the two space areas 52, 54 also in the engaged state of the lockup clutch, i.e., when the clutch piston 50 contacts the housing shell 14 on the radially outer side, it is possible, for example, to provide a friction facing at the clutch piston 50 with grooves so that heat can also be carried away from this region of the friction facing at the same time. Alternatively or in addition, it is possible to provide one or more openings 58 in the clutch piston 50 so that fluid can flow from the first space area 52 to the second space area 54, or vice versa, corresponding to the pressure ratios adjusted in the interior space 24.

A first fluid channel area 60, which can comprise one or more openings or grooves 62 in the pressure ring 42, is provided for supplying the hydrodynamic torque converter 10 with fluid. This first fluid channel area 60 accordingly leads into an area of the interior space 24 which lies between the impeller 20 and the turbine 26.

A second fluid channel area 64 comprises, for example, one or more openings 66 in the turbine hub 32 and leads to an area of the internal space 24 that is formed substantially between the turbine 26 and the clutch piston 50. Accordingly, both the first fluid channel area 60 and second fluid channel area 64 lead into the first space area 52. As will be explained in the following, each of these fluid channel areas 60, 64 can be used to supply fluid to and/or remove fluid from the first space area 52. A third fluid channel area 68 comprises, for example, one or more openings 70 in the turbine hub 32 and leads into the second space area 54. By supplying fluid via the third channel area 70, the fluid pressure in the second space area 54 can be increased, particularly also relative to the fluid pressure in the first space area 52, in order to generate a force action loading the clutch piston 50 in the disengaging direction. If the fluid pressure in the first space area 52 is higher in relation to the fluid pressure in the second space area 54, a force action loading the clutch piston 50 in the engaging direction is generated.

By providing the first fluid channel area 60 and the second fluid channel area 64, it is possible to ensure an exchange of fluid in the first space area 52 even in the engaged state of the lockup clutch, i.e., when the clutch piston 50 contacts the radially outer side of the housing 12, in order to prevent overheating. In so doing, a fluid flow into the second space area 54 can also take place, for example, via openings 58, so that an at least smaller outflow of fluid is also possible there in the engaged state of the lockup clutch 48.

In the disengaged state of the lockup clutch, a continuous fluid communication is made possible by the supply of fluid into the second space area 54 and the possibility for this fluid to arrive in the first space area 52 at least at the radially outer side, combined with the fact that fluid is also introduced into the first space area 52, for example, via the first fluid channel area 60. This fluid can then flow off, for example, via the second fluid channel area 64.

For operation of the hydrodynamic coupling device 10, a control device is provided which ensures by generating corresponding control commands, for example, for a switching valve arrangement, that a fluid supply pressure is supplied, or is present, via the fluid supply channel or fluid supply channels intended for a respective operating state. The fluid pressure, which is generated by a fluid pump in the gear unit is used for this purpose, and the level of the fluid pressure to be supplied via a respective fluid channel area can be adjusted through correspondingly timed or pulsed control of a switching valve of this kind. Of course, the pressure ratios resulting in the internal space 24, particularly in the space areas 52, 54, also depend upon the operating state, but do not necessarily correspond to the respective fluid supply pressure in a fluid channel area.

SUMMARY OF THE INVENTION

It is an object of the present invention to provide a method for operating an open 3-line type hydrodynamic coupling device that ensures an efficient operation while exploiting the technical possibilities and advantages of a hydrodynamic coupling device of this type.

A method according to one embodiment of the invention for operating an open 3-line type hydrodynamic coupling device, the hydrodynamic coupling device comprising a housing arrangement which is filled, or can be filled, with fluid, an impeller which is rotatable with the housing arrangement around an axis of rotation, a turbine which is arranged in the housing arrangement and coupled with a driven member for rotation around the axis of rotation, a lockup clutch for selectively producing a torque transmission connection between the housing arrangement and the driven member, wherein the lockup clutch comprises a clutch piston dividing an internal space of the housing arrangement into a first space area containing the turbine and a second space area, wherein the first space area and the second space area are in fluid communication with one another at least when the lockup clutch is disengaged, a first fluid channel area leading to the first space area, and a second fluid channel area leading to the first space area, wherein fluid can be supplied to the first space area via the first fluid channel area and/or the second fluid channel area and fluid can be removed from the first space area via the first fluid channel area and/or the second fluid channel area, a third fluid channel area at least for supplying fluid to the second space area, in which method a fluid pressure displacing the clutch piston in the engaging direction is provided in the first space area for engaging the lockup clutch and a fluid pressure displacing the clutch piston in the disengaging direction is provided in the second space area for disengaging the lockup clutch. In this connection, it is further provided that a fluid supply pressure for the first space area and/or a fluid supply pressure for the second space area are/is adjusted depending on at least one operating variable in the engaged state of the lockup clutch and/or in the disengaged state of the lockup clutch and/or for engaging the lockup clutch and/or for disengaging the lockup clutch.

By operating the hydrodynamic coupling device to be adapted to a respective operating state, this operating state being represented substantially by at least one operating variable, it is possible to ensure that excessive heating in the area of the coupling device can be prevented, i.e., a sufficient fluid circulation through the interior space is ensured, while providing the respective required torque conversion capacity or transmission capacity using the least possible energy.

In this connection, it can be provided that the at least one operating variable includes a temperature in the region of the coupling device, particularly fluid temperature, and/or a load on the coupling device in torque-transmission/conversion operation. By taking into account the temperature in the region of the coupling device, i.e., for example, the fluid temperature such as can be acquired in a transmission sump, it is possible—just as when taking into account the load on the coupling device which in turn is itself very closely related to the development of heat in the coupling device—to prevent overloading also due to excessive thermal loading.

In addition, it can also be provided, for example, that when the lockup clutch is disengaged the fluid supply pressure for the first space area is adjusted to a higher value when at a higher temperature and/or under a higher load than when at a lower temperature and/or lower load. By an increased supply of fluid in the first space area at a higher temperature and/or under a higher load, an increased throughput of fluid through the first space area is achieved when the lockup clutch is disengaged, i.e., generally in torque conversion operation. When it is further provided that when the lockup clutch is disengaged the fluid supply pressure for the second space area is adjusted to a higher value when at a higher temperature and/or higher load than when at lower temperature and/or lower load, an increased fluid throughput through the second space area is also ensured in this operating state.

Further, it can be provided that when the lockup clutch is engaged the fluid supply pressure for the first space area is adjusted to a higher value when at higher temperature and/or higher load than when at lower temperature and/or lower load. In the engaged state of the lockup clutch, the latter is comparatively highly loaded and an increased fluid supply pressure for the first space area can contribute to an increased torque transmission capacity, i.e., a reduced risk of slippage, on the one hand, but can also ensure that a sufficient removal of heat is carried out by increased throughput with fluid on the other hand.

In order to keep the fluid pressure in the first space area very high at least temporarily, particularly in very high load states, it is proposed that when the lockup clutch is engaged the fluid supply pressure for the first space area is provided via the first fluid channel area and the second fluid channel area under higher loads and the fluid supply pressure for the first space area is provided via the first fluid channel area or the second fluid channel area under lower loads. At the same time, this step ensures that a sufficient fluid communication is achieved under lower loads, i.e., in a state such as occurs appreciably more often and for longer periods of time compared to a very high load.

States in which the coupling device is loaded very highly include, for example, a process of reversing driving direction, i.e., reversing, especially when a very high engine braking effect is also used for this purpose. Another high-load state can occur, for example, when the transmission ratio in a transmission is to be changed when the lockup clutch is kept in the engaged state. This can result in shift shocks which can lead very briefly to a sharp increase in torque and, therefore, can result in a very high loading of the coupling device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention will be described in the following with reference to the accompanying drawings. The drawings show:

FIGS. 2 and 3 are flowcharts illustrating the operation of the hydrodynamic coupling device.

DETAILED DESCRIPTION OF THE PRESENTLY PREFERRED EMBODIMENTS

Figure 1:
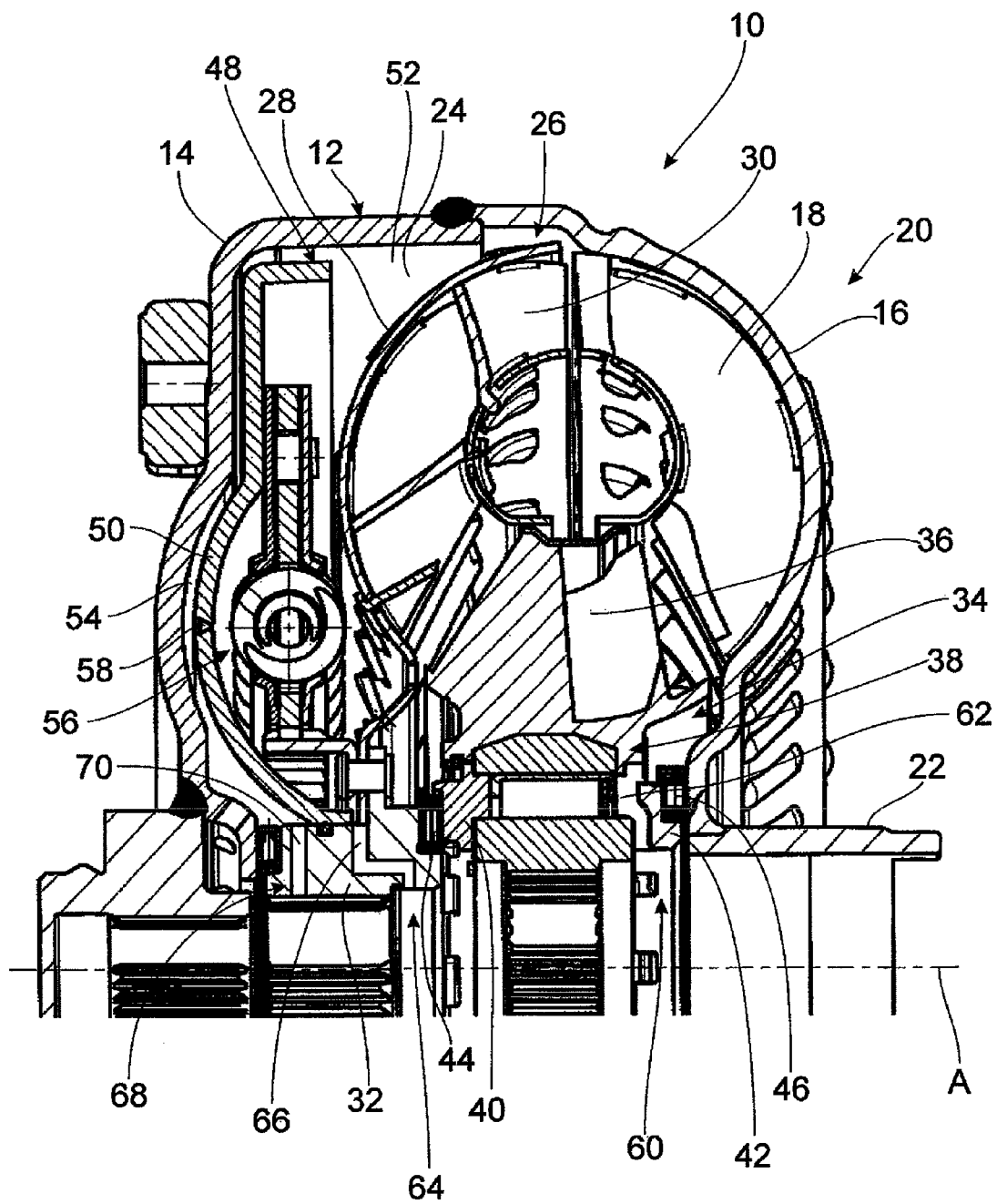
FIG. 1 is an open 3-line type hydrodynamic coupling device.
Figure 2:
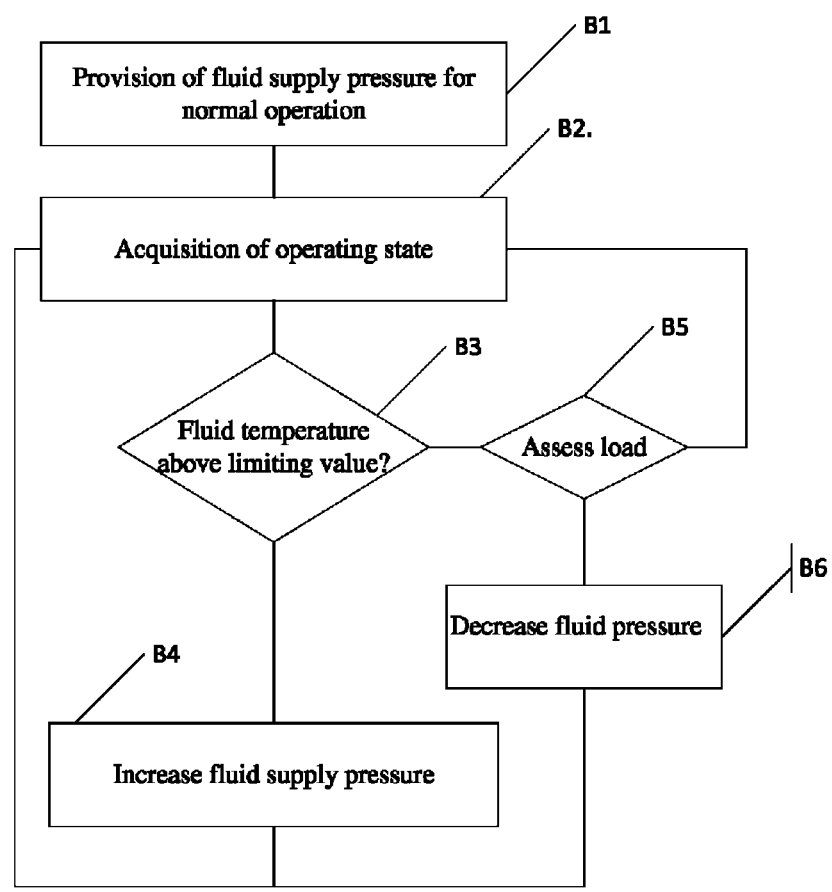

The control and operation of a hydrodynamic coupling device, i.e., a hydrodynamic torque converter, for example, constructed in the manner described above by way of example with reference to FIG. 1 will be described in the following with reference to the flowcharts in FIGS. 2 and 3. In this connection, it should be noted that relevant steps, i.e., for example, interrogations and decisions, are represented in principle in these flowcharts in the context of the present invention.

Referring to the flowchart in FIG. 2, the manner of operation, according to one embodiment of the invention, in case of an open, i.e., disengaged, lockup clutch 48 will be described in the following. A fluid supply pressure of 5 bar is provided for normal torque conversion operation in a block B1, for example, for the first fluid channel area 60. For the third fluid channel area 68, a fluid supply pressure of 6 bar can be provided so that basically a pressure difference acting upon the clutch piston 50 in the disengaging direction is generated between the first space area 52 and the second space area 54. It will be seen that the fluid supply pressure for the third fluid channel area 68 is only around 1 bar, i.e., is slightly above the fluid supply pressure for the first fluid channel area 60, which is sufficient to keep the lockup clutch 48 disengaged but at the same time ensures a sufficient flow of fluid through the interior space 24. In this state, a pressure in the range of about 3 bar, for example, is adjusted at the second fluid channel area 64 carrying away the fluid.

Different operating states can then be acquired, or information representing these different operating states can be provided, in a block B2. For example, the fluid temperature or oil temperature such as can be acquired either in an oil sump of a transmission or at the outlet area of the coupling device 10 can be provided. The load on the coupling device 10 can be provided based on different information generated in a vehicle. For example, the torque provided by a drive unit and which is to be conducted via the drivetrain and, therefore, also via the coupling device 10 can be taken into account as a quantity designating the load state. The information that a reversal in driving direction has taken place, i.e., for example, shifting into reverse or shifting out of reverse, is also information designating the load state, since a comparatively high loading of the coupling device 10 occurs during this reversing. In an interrogation block B3, it can be determined whether or not the fluid temperature lies above an associated limiting value. If so, i.e., if the fluid temperature is too high, the fluid supply pressure for the first fluid channel area 60 is adjusted or increased to 7 bar in a block B4 in order to achieve an increased fluid throughput. To keep the lockup clutch 48 disengaged, the fluid supply pressure for the third fluid channel area 68 is adjusted or increased to 8 bar, i.e., somewhat higher than the fluid pressure at the first fluid channel area 60.

In so doing, a fluid pressure of about 3 bar can be adjusted in turn at the second fluid channel area 64.

The reaction to be generated in interrogation block B3 leads to block B4 can also be carried out, for example, alternatively or in addition by taking account of the load. When a vehicle is to be operated in a reversing process, i.e., if the driving direction is to be reversed, this leads to a comparatively high loading of the coupling device 10. This may also make it necessary to increase the exchange of fluid.

When the result of the interrogation in interrogation block B3 is that the fluid temperature is not excessively high, i.e., does not lie above a limiting value, the load can be assessed in another interrogation block B5. If it is determined that the load is low, i.e., also lower than in a normal torque conversion operation, for example, it is possible to reduce the fluid throughput, particularly since the fluid temperature is also not excessively high. The fluid supply pressure for the first fluid channel area 60 can then be adjusted or reduced to about 3 bar, for example. The fluid supply pressure for the third fluid line area 68 can be adjusted or reduced to about 5 bar so that a pressure of about 2 bar is adjusted, for example, at the second fluid channel area 64. This can be carried out in a block B6.

In continuing operation, the different operating variables which also have an effect on the operation of the coupling device 10 can then be monitored and supplied repeatedly in block B2 in order to achieve an adjustment in the control of the coupling device 10 if necessary.

The control and operation of the coupling device 10 when the lockup clutch 48 is closed or engaged or to be engaged will be described with reference to the flowchart in FIG. 3. In this case different quantities representing the operating state of a vehicle or the operating state of the coupling device are determined and supplied initially in a block B7. In this case, the fluid supply pressure for the first fluid channel area 60 can be adjusted to about 8 bar for normal torque transmission operation, for example, when a driving torque or braking torque lies within a normal range. The third fluid channel area 68 is substantially relieved of pressure so that, for example, due to the fact that a fluid flow from the first space area 52 to the second space area 54 can take place via the openings 58, a somewhat higher pressure which can amount to up to 2 bar can be adjusted when the fluid is conducted via a fluid cooler and not directly into a fluid sump. A pressure of about 5 bar, for example, then results at the second fluid channel area 64. With pressure ratios of this kind, it is ensured on the one hand that the clutch piston 50 is pressed against the housing 12 sufficiently firmly that the torque to be transmitted can be conveyed onward without slippage. On the other hand, a sufficient fluid communication is ensured.

It can be determined in an interrogation block B8 whether or not the vehicle is in idling operation. If it is not, the pressure ratios adjusted on the basis of the information from block B7, for example, are retained.

If the result of the interrogation of interrogation block B8 is that the vehicle is in idling operation, it is determined in another interrogation block B9 whether or not the lockup clutch 48 is actually closed. If it is not, a fluid supply pressure of 3 bar, for example, can be adjusted in a block B10 for the idling operation of the vehicle and, therefore, also of the lockup clutch 48 for the first fluid channel area 60. The third fluid channel area 68 is again depressurized, and a fluid pressure of 2 bar, for example, can be adjusted at the second fluid channel area 64 contingent upon the fluid supply pressure for the first channel area 60. The pressure difference which has built up in this state between the two space areas 52 and 54 is sufficient to prevent a slippage of the lockup clutch 48 in the idling state.

It can be verified in an interrogation block B11 with the lockup clutch 48 already closed whether the lockup clutch 48 is held in the engaged state by the pressure ratios provided for idling operation. If this is the case, the procedure can be run through again for updating. If it is not the case, the pressure ratios provided for idling operation can be adjusted again. This means that block B10, for example, can also be proceeded to from interrogation block B11 and the corresponding pressure ratios can be adjusted.

A state in which the coupling device 10 and particularly the lockup clutch 48 in the engaged state thereof can be highly loaded exists when changing the transmission ratio in a transmission which follows in the drivetrain, i.e., for example, when a gear change is to be carried out, without disengaging the lockup clutch. This requires a very high torque transmission capacity in the lockup clutch 48 and, therefore, a correspondingly high pressing pressure for the clutch piston 50. To this end, it is possible to proceed in such a way that when corresponding information exists, i.e., a shift command, for example, a very high fluid supply pressure of, e.g., 9 bar is applied or supplied via both the first fluid channel area 60 and second fluid channel area 64. On the one hand, this leads to a comparatively rapid increase in pressure in the first space area 52. On the other hand, leakage of fluid, for example, via the second fluid channel area 64, which reduces the fluid pressure in the first space area 52 is ruled out. Leakage of fluid can take place only via the openings 58 and in the second space area 54. However, this is comparatively small. In operation of this kind, also generally known as a boost state, a very high torque can be transmitted via the lockup clutch 48 so that even very high torque shocks such as can occur when spontaneously changing the transmission ratio do not lead to slippage of the lockup clutch 48.

One embodiment of the present invention allows an open 3-line type hydrodynamic coupling device, particularly a hydrodynamic torque converter, to be operated so as to be adapted in an optimal manner to different operating variables so that even when there are very high loads or temperatures in the region of the coupling device, an overload can be ruled out, but the desired torque transmission capacity is ensured at the same time. Accordingly, the operation according to the invention, especially in connection with its use in an open 3-line type hydrodynamic coupling device, is suitable above all when applied in a utility vehicle.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for operating an open 3-line type hydrodynamic coupling device, the hydrodynamic coupling device comprising:
    a housing arrangement that is one of filled with a fluid or fillable with a fluid;
    an impeller that is rotatable with the housing arrangement around an axis of rotation;
    a turbine arranged in the housing arrangement and coupled with a driven member for rotation around the axis of rotation;
    a lockup clutch that selectively produces a torque transmission connection between the housing arrangement and the driven member, wherein the lockup clutch comprises:
        a clutch piston dividing an internal space of the housing arrangement into a first space containing the turbine and a second space,
        wherein the first space and the second space are in fluid communication with one another at least when the lockup clutch is disengaged,
        a first fluid channel leading to the first space;
        a second fluid channel leading to the first space,
        wherein the fluid can be supplied to the first space via at least one of the first fluid channel and the second fluid channel and the fluid can be removed from the first space via at least one of the first fluid channel and the second fluid channel; and
        a third fluid channel configured to at least supply the fluid to the second space, the method comprises:
    displacing the clutch piston by a first fluid pressure in the engaging direction, the first fluid pressure provided in the first space for engaging the lockup clutch;
    displacing the clutch piston in the disengaging direction by a second fluid pressure provided in the second space for disengaging the lockup clutch;
    adjusting at least one of a fluid supply pressure for the first space and a fluid supply pressure for the second space based at least in part on at least one operating variable:
        in the engaged state of the lockup clutch and in the disengaged state of the lockup clutch and for engaging the lockup clutch and for disengaging the lockup clutch,
    wherein the at least one operating variable comprises at least one of:
    a temperature in the region of the coupling device,
    a fluid temperature in the region of the coupling device, and
    a loading of the coupling device in torque-transmission/conversion operation
    wherein when the lockup clutch is disengaged the fluid supply pressure for the second space is adjusted to a higher value when at one of a higher temperature and higher load than when at one of a lower temperature and lower load.

2. A method for operating an open 3-line type hydrodynamic coupling device, the hydrodynamic coupling device comprising:
    a housing arrangement that is one of filled with a fluid or fillable with a fluid;
    an impeller that is rotatable with the housing arrangement around an axis of rotation;
    a turbine arranged in the housing arrangement and coupled with a driven member for rotation around the axis of rotation;
    a lockup clutch that selectively produces a torque transmission connection between the housing arrangement and the driven member, wherein the lockup clutch comprises:
        a clutch piston dividing an internal space of the housing arrangement into a first space containing the turbine and a second space, wherein the first space and the second space are in fluid communication with one another at least when the lockup clutch is disengaged, a first fluid channel leading to the first space;

a second fluid channel leading to the first space, wherein the fluid can be supplied to the first space via at least one of the first fluid channel and the second fluid channel and the fluid can be removed from the first space via at least one of the first fluid channel and the second fluid channel; and a third fluid channel configured to at least supply the fluid to the second space, the method comprises:

displacing the clutch piston by a first fluid pressure in the engaging direction, the first fluid pressure provided in the first space for engaging the lockup clutch;

displacing the clutch piston in the disengaging direction by a second fluid pressure provided in the second space for disengaging the lockup clutch;

adjusting at least one of a fluid supply pressure for the first space and a fluid supply pressure for the second space based at least in part on at least one operating variable:

in the engaged state of the lockup clutch and in the disengaged state of the lockup clutch and for engaging the lockup clutch and for disengaging the lockup clutch, wherein the at least one operating variable comprises at least one of:

a temperature in the region of the coupling device, a fluid temperature in the region of the coupling device, and a loading of the coupling device in torque-transmission/conversion operation wherein when the lockup clutch is disengaged the fluid supply pressure for the second space is adjusted to a higher value when at one of a higher temperature and higher load than when at one of a lower temperature and lower load wherein when the lockup clutch is engaged the fluid supply pressure for the first space is adjusted to a higher value when at one of a higher temperature and higher load than when at one of a lower temperature and lower load.

3. The method according to claim 2, wherein when the lockup clutch is engaged the fluid supply pressure for the first space is supplied via the first fluid channel and the second fluid channel under higher load and the fluid supply pressure for the first space is supplied via one of the first fluid channel and the second fluid channel under lower load.

4. The method according to claim 1, wherein a state of higher load exists when the coupling device is operated for torque transmission/conversion during at least one of a process of reversing driving direction and during a process of changing the transmission ratio when the lockup clutch is in the engaged state.

* * * * *